United States Patent Office 3,056,828
Patented Oct. 2, 1962

3,056,828
2-SUBSTITUTED-2-PROPARGYL PROPANEDIOL DICARBAMATES
John Mulvin Parker, Montreal, Quebec, and Burton Kendall Wasson, Valois, Quebec, Canada, assignors to Charles E. Frosst & Co., Montreal, Quebec, Canada, a corporation of the Province of Quebec
No Drawing. Original application Nov. 8, 1957, Ser. No. 695,234. Divided and this application Apr. 10, 1959, Ser. No. 805,392
3 Claims. (Cl. 260—482)

This invention relates to new 2-substituted-2-propargyl-1,3-propanediol dicarbamates and to processes for their preparation.

While various substances are known to induce tranquilizing and related effects in vertebrates, many such substances are deficient in one or more respects. For example, certain of them require very large doses to induce any appreciable degree of tranquility. Others exhibit undesirable side- or after-effects, and some are sufficiently toxic to necessitate great care in their use. Furthermore, some also induce on continued use, a degree of dependence which approaches habituation. In U.S.P. 2,724,720, there is described certain compounds which are 2-substituted propanediol dicarbamates and these are effective central nervous system depressants and also possess anti-convulsant properties as well as other thereapeutic values.

In accordance with the present invention it has now been found that the hitherto unknown 2-substituted-2-propargyl-1,3-propanediol dicarbamates of the general formula:

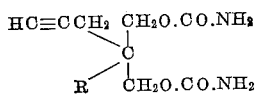

where R stands for ethyl or allyl, possess psychotropic properties varied from other known 2-substituted-1,3-propanediol dicarbamates.

The compounds of the present invention while having no paralyzing property show unexpected energizing properties in that increased excitability of animals occurs following doses well below toxic levels as can be seen in Table I.

TABLE I

| | LD$_{50}$, mg./kg. | Excitation mg./kg. |
|---|---|---|
| 2-ethyl-2-propargyl-1,3-propanediol dicarbamate | 820 | 350 |
| 2-allyl-2-propargyl-1,3-propanediol dicarbamate | 710 | 120 |

These effects are different from those seen with d-amphetamine and other known excitants.

The preparation of the products of the present invention can be illustrated schematically as follows:

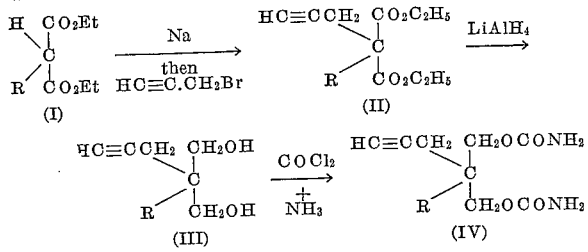

The new derivatives (IV) of the present invention may be prepared by the following sequence of reactions: (a) The diethyl monosubstituted malonate (I) is treated with sodium ethylate in ethanol and the sodium salt is then reacted with propargyl bromide to give a diethyl propargyl malonate substituted as shown in formula II; (b) This compound (II) is then reduced with lithium aluminum hydride to give the novel 2-substituted-2-propargyl-1,3-propanediol (III); (c) The 2-substituted-2-propargyl-1,3-propanediol (III) is then treated with phosgene to give the di(chlorocarbonate) which is then reacted with anhydrous ammonia or ammonium hydroxide to give the 2-substituted - 2 - propargyl-1,3 - propanediol dicarbamate (IV). The intermediate propanediols (III) and di(chlorocarbonates) need not be isolated or purified as the resulting end products are satisfactory. The diethyl propargyl malonates having the general formula

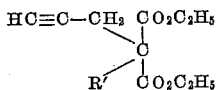

wherein R' is selected from the group consisting of a substituted alkyl radical having from 1 to 6 carbon atoms and an alkenyl radical having from 2 to 6 carbon atoms, are novel intermediates. When prepared by the aforesaid process the product of the invention is normally isolated as a white crystalline solid. Further purification may be achieved by recrystallization of the material from methanol or from methanol and ethyl ether.

Alternatively, the 2 - substituted-2-propargyl-1,3-propanediol dicarbamates (IV) may also be readily prepared from the corresponding 2-substituted-2-propargyl-1,3-propanediols (III) without the use of an acid acceptor. Thus one mole of the diol in tetrahydrofuran was reacted in the cold with an excess of two moles of phosgene in tetrahydrofuran. The resulting solution of di(chlorocarbonate) was then treated with either ammonium hydroxide or gaseous ammonia to give the 2-substituted-2-propargyl-1,3-propanediol dicarbamate in high yield.

The new substituted 2-propargyl-1,3-propanediol dicarbamates (IV) are psychotropics with varied properties characterized by stability and long duration of action. For therapeutic use, the compounds can be advantageously compounded with other known active agents for example hormones, steroids, antacids, anticholinergics and vitamins. The new propanediol dicarbamates singly or in combination with other known pharmaceutical active agents can be incorporated into various known pharmaceutically elegant forms such as tablets, capsules, suspensions, etc., for easy administration to patients.

Example 1

2-ALLYL-2-PROPARGYL-1,3-PROPANEDIOL DICARBAMATE

*Diethyl allylpropargyl malonate.*—Diethyl allylmalonate (116.5 grams) was added during 5–10 minutes to a solution of sodium ethoxide (from 13.1 grams of sodium dissolved in 427 ml. of ethanol). The mixture was stirred for a period of one-half hour and 67.7 grams of propargyl bromide was added during thirty minutes with stirring and the reaction temperatures was maintained at 30–55° C., the mixture was stirred a further one hour and then left at room temperature overnight. The mixture was refluxed twelve hours, at which time the pH value had dropped to 7. The ethanol was removed in vacuo, the resulting residual oil was diluted with water, and then extracted with benzene. The benzene extracts were combined, washed with a small portion of water, and the benzene removed. The residue was distilled in vacuo to give 112.6 grams of diethyl allylpropargylmalonate, b$_{0.4-0.5}$ 75–80° C. The malonate was a clear colourless liquid of typical odor.

*2-Allyl-2-propargyl-1,3-propanediol.*—Diethyl allylpropargylmalonate (56.3 grams) was dissolved in 168 ml.

of ethyl ether and then added dropwise to 22.8 grams lithium aluminum hydride partially dissolved and partially suspended in 550 ml. of ethyl ether accompanied with stirring at a temperature of 0°. The reaction was run under a positive pressure of nitrogen gas. The reaction mixture was stirred at this temperature a further two hours, the ice-salt bath removed, and the mixture left at room temperature overnight. The mixture was cooled with ice-salt bath and ice was added slowly with stirring until the excess of the lithium aluminum hydride was decomposed. The heavy slurry was acidified with dilute hydrochloric acid, the solution saturated with sodium chloride, and then extracted 4 to 5 times with ethyl ether. The combined ether extracts were washed to neutrality with water, and distilled to dryness to give a residual oil. This oil was distilled in vacuo to give 27.0 grams of 2-allyl-2-propargyl-1,3-propanediol, $b_{0.05-0.07}$ 82–87° C. The crude 2-allyl-2-propargyl-1,3-propanediol may also be used in the following reaction.

*2 - Allyl - 2 - propargyl - 1,3 - propanediol - 1,3 - dicarbamate.*—2-allyl-2-propargyl - 1,3 - propanediol (27.0 grams) was dissolved in 135 ml. of chloroform containing 63.7 grams antipyrine and this solution was added dropwise with stirring during one hour at —5° C. to 36.1 grams of phosgene dissolved in 270 ml. of toluene. The mixture was stirred at this temperature for thirty minutes, and then left at room temperature overnight. The mixture was cooled to —5° and gaseous ammonia passed in until the mixture gave a permanent alkaline test. The lumps which formed were broken up during this process to insure complete reaction. The precipitated solids were filtered, washed with more toluene, and dried. The dry product was triturated with about 200 ml. of water, and filtered. The crude product was recrystallized from hot water to give 28.3 grams of 2-allyl-2-propargyl-1,3-propanediol dicarbamate, M.P. 115–25° C. Further recrystallization from methanol and ethyl ether gave fine leaves with a melting point of 151–2° C. The infrared spectrum in KBr pellet showed a strong band at 900 cm.$^{-1}$ for the CH$_2$ out of plane deformation and a shoulder at 3010 cm.$^{-1}$. The acetylenic bond gave a weak band at 2125 cm.$^{-1}$ and the amide band was strong at 1612 cm.$^{-1}$. The NH$_2$ stretching bands were in the region of 3230 to 3465 cm.$^{-1}$.

*Example II*

2-ETHYL-2-PROPARGYL-1,3-PROPANEDIOL DICARBAMATE

As in example I, 60.0 grams of diethyl ethylpropargylmalonate was reduced with 20.0 grams of lithium aluminum hydride to give 33.3 grams of 2-ethyl-2-propargyl-1,3-propanediol. This crude 2-ethyl-2-propargyl-1,3-propanediol (33.3 grams) was reacted with phosgene in toluene, chloroform, and antipyrine in the cold and then, without removal of the antipyrine hydrochloride, the mixture was cooled to —10° C., treated with anhydrous ammonia, the precipitate collected, the solids triturated with water, the solids collected and recrystallized from water, and dried to give 27.3 grams of 2-ethyl-2-propargyl-1,3-propanediol dicarbamate, M.P. 114.5–116.0° C. Concentration of the liquors gave a further crop of 9.9 grams of product, M.P. 106–111° C. This application is a division of our copending application, Serial No. 695,234, filed November 8, 1957.

We claim:

1. The 2-substituted-2-propargyl-1,3-propanediol dicarbamates of the general formula

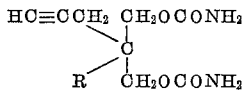

wherein R is a member selected from the group consisting of ethyl and allyl radicals.

2. 2-ethyl-2-propargyl-1,3-propanediol dicarbamate.
3. 2-allyl-2-propargyl-1,3-propanediol dicarbamate.

No references cited.